Patented Feb. 6, 1923.

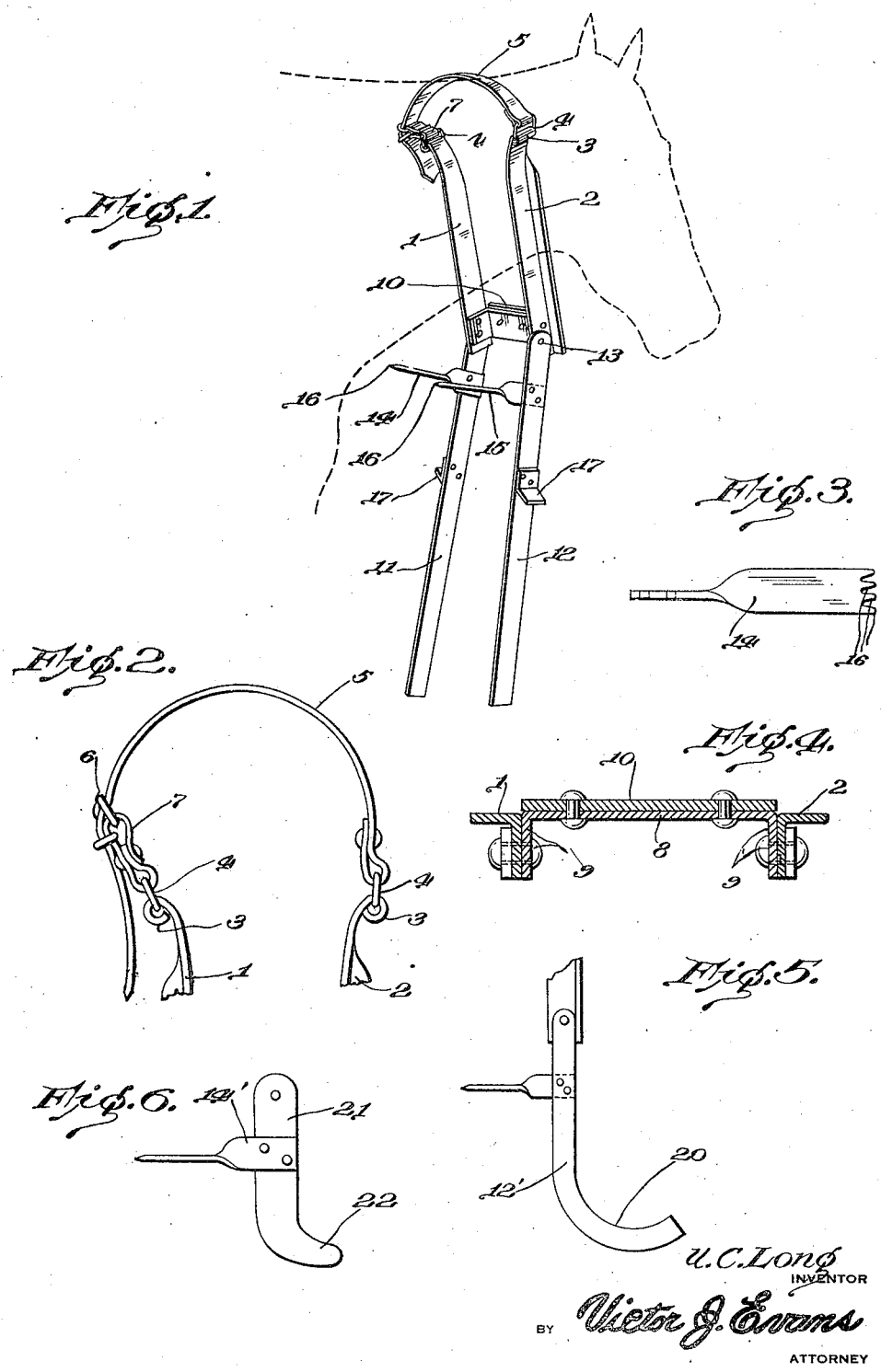

UNITED STATES PATENT OFFICE.

1,444,692

ULY C. LONG, OF SOUTH WHITLEY, INDIANA.

YOKE.

Application filed December 10, 1921. Serial No. 521,429.

*To all whom it may concern:*

Be it known that I, ULY C. LONG, a citizen of the United States, residing at South Whitley, in the county of Whitley and State of Indiana, have invented new and useful Improvements in Yokes, of which the following is a specification.

This invention relates to improvements on yokes for domestic animals and embodies an improvement over a similar structure disclosed in the application for Letters-Patent filed 7th day of February 1921, Serial No. 443,165 which has since become Patent No. 1,403,427 issued Jan. 10, 1922.

An object of this invention is to provide a yoke as specified which will permit unimpeded grazing of the animal but which will upon the attempting of the animal to go through or over a fence cause irritation to the animal, causing it to desist in its efforts to break through or pass over the fence.

Another object of this invention is to provide a yoke as specified which is particularly designed to avoid unnecessary rubbing or irritation on the neck and head of the animal, and one which will prevent him from tramping down wire fences and passing through or over a fence.

Other objects of the invention will appear in the following detailed description taken in connection with the accompanying drawings wherein:

Fig. 1 is a perspective view of the improved yoke.

Fig. 2 is an enlarged fragmentary side elevation of the yoke.

Fig. 3 is a plan view of one of the animal irritators.

Fig. 4 is a detail of the cross brace structure illustrating a non-irritating pad attached thereto.

Fig. 5 is a side elevation of a modified form of the yoke.

Fig. 6 is a side elevation of a further modification of the yoke structure.

Referring more particularly to the drawings, the improved yoke comprises a pair of neck engaging members 1 and 2 which are preferably formed of angle iron or analogous metal, the upper ends of which are folded to form link receiving rolls 3 in which the links 4 are connected. A strap 5 has one end connected to one of the links 4 and it is adapted for detachable connection with a buckle 6 which is connected to the other of the links by means of a strap connector 7 as clearly shown in Figs. 1 and 2 of the drawings, thereby providing a flexible non-irritating band for engagement over the top of the neck of the animal on which it is used. The lower ends of the neck engaging members 1 and 2 are connected by a cross brace 8, the ends of which are bent to engage the neck engaging members and are riveted thereto as shown at 9. A pad 10 of any suitable non-irritating material is riveted to the front side of the cross brace 8 to prevent irritation of the head of the animal.

Bars 11 and 12 are pivotally connected to the lower ends of the members 1 and 2 as shown at 13 and they have prickers or irritating members 14 and 15 attached thereto each of which comprises a plurality of rearwardly extending pricking points or teeth 16 adapted to prick and irritate the animal on which the improved yoke is mounted, providing the animal endeavors to go over, through or under a fence structure.

During grazing the prickers 14 and 15 remain in such position as not to injure the animal or prevent his proper grazing.

The members 1 and 2 are rounded or bent outwardly from the animal to form a flat surface next to the animal's head to prevent irritation and injury to the animal. The bars 11 and 12 have hook members 17 attached thereto to prevent the animal from drawing the yoke over a fence in a sidewise manner.

In Fig. 5 of the drawings a slight modification of the improved yoke is shown which modification is designed for use on cattle. In the modified form the bars 12′ which correspond to the bars 11 and 12 and are pivotally connected to the neck engaging members in the same manner in which the bars 11 and 12 are connected, have their lower ends curved forwardly as shown at 20 presenting concave edges upwardly and forwardly, which curved ends will eliminate the need of the hooks 17.

In Fig. 6 of the drawings a further modification is shown in which the prickers 14′ are carried by members 21 the lower ends of which are curved or bent forwardly providing transverse end portions 22 which serve the same function as the hooks 17.

It is, of course, to be understood that the invention may be constructed in other manners and the parts associated in other relations and, therefore, I do not desire to be limited in any manner except as set forth in the claim hereunto appended.

Having thus described my invention what I claim is:

A yoke comprising a pair of neck members, a strap connecting the upper ends of the members, a cross bar rigidly connecting the lower ends of the members together, vertical bars each having its upper end pivotally connected to a member and said cross bar, pricking elements secured to the inner sides of said vertical bars and projecting rearwardly, and hook members secured to the outer sides of the vertical bars and extending at right angles to said elements.

In testimony whereof I affix my signature.

ULY C. LONG.